US006734871B2

(12) United States Patent
Weil et al.

(10) Patent No.: US 6,734,871 B2
(45) Date of Patent: *May 11, 2004

(54) FLEXIBLE SCHEMES FOR APPLYING PROPERTIES TO INFORMATION IN A MEDIUM

(75) Inventors: Steven E. Weil, Bellevue, WA (US); Michael B. Orr, Bainbridge Island, WA (US); Joseph King, Seattle, WA (US); Nathan W. Everett, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/935,136

(22) Filed: Aug. 21, 2001

(65) Prior Publication Data

US 2001/0054050 A1 Dec. 20, 2001

Related U.S. Application Data

(63) Continuation of application No. 08/807,345, filed on Feb. 28, 1997, now Pat. No. 6,278,462.

(51) Int. Cl.[7] ............................................. G06T 15/00
(52) U.S. Cl. ...................................................... 345/619
(58) Field of Search ................................. 345/619, 620, 345/419, 420, 426, 428

(56) References Cited

U.S. PATENT DOCUMENTS 6,278,462 B1 * 8/2001 Weil et al. .................. 345/433

* cited by examiner

Primary Examiner—Phu K. Nguyen
(74) Attorney, Agent, or Firm—Banner & Witcoff, Ltd.

(57) ABSTRACT

A scheme data structure is used for applying a set of coordinated attributes to any number of components within a composition such as a document, Internet web page, computer screen etc. A scheme data structure allows a user to easily apply variations of professionally designed font, color, graphic, paragraph and other schemes to a composition. The data structure includes a scheme instance category indicating a type of scheme and a number of attributes corresponding to the scheme instance category. The structure has a number of scheme slots, and each scheme slot can be associated with zero or more components of the composition. Each of the scheme slots is arranged to hold a distinct value for each of the attributes. Thus, for each of the scheme slots, the scheme instance data structure may be used to apply values of attributes to the components of the composition associated with each scheme slot. Each scheme instance data structure may also have a number of levels. Each level contains a complete set of values for the attributes of that scheme. User input is used to determine which level should be applied to each component. A user specifies an amount value indicating number of components affected and a diversity value indicating diversity of scheme attributes affecting the components. A threshold value for each component indicates a range of difficulty for changing default values for attributes of that component. A method also applies values in a determined scheme level to components of a composition in response to user input.

11 Claims, 12 Drawing Sheets

FONT SCHEME SLOTS / ATTRIBUTES

| | Typeface | Size | Bold? | Italic? — 244 |
|---|---|---|---|---|
| 246 — BodyText | Times | 12 | No | No |
| 247 — BodyEmph. | Times | 12 | Yes | No |
| 248 — Doc. Title | Ariel | 20 | Yes | No |
| 249 — MinorTitle | Ariel | 14 | Yes | No |

242

240 → Traditional Font Scheme  FIG. 3

COLOR SCHEME SLOTS / ATTRIBUTES  254

| | Text Fore | Text Fill | Graphics Fore | Graphics Fill |
|---|---|---|---|---|
| 256 — Normal | Black | White | Black | White |
| 257 — Emph. | Black | Gray | Black | Gray |
| 258 — DeEmph. | Gray | White | Gray | White |
| 259 — Accent | Green | White | Red | White |

252

250 → Holiday Color Scheme  FIG. 4

GRAPHIC SCHEME SLOTS / ATTRIBUTES

| | Box Fill | Box Edge | Shadow | Line — 264 |
|---|---|---|---|---|
| 266 — Small Comp. | Texture | Graphic Border | No | Single Rule Round End Cap |
| 267 — Large Comp. | Null | Double Rule | No | Single Rule Round End Cap |
| 268 — Illustr. | Null | Triple Rule | Bottom Offset Right Offset | Triple Rule Chiseled End |
| 269 — Margin | Null | Graphic Border | No | Single Rule |

262

260 → Festive Graphic Scheme  FIG. 5

| FONT SCHEME SLOTS 274 | Typeface | Min. Font Size | Max. Font Size | Nom. Font Size | ATTRIBUTES 270 Bold? | Italic? | Lead. | Small Capitals |
|---|---|---|---|---|---|---|---|---|
| BodyText | | | | | | | | |
| BodyEmphasis | | | | | | | | |
| BodyEmphasis Short | | | | | | | | |
| Body Lead | | | | | | | | |
| DocumentTitle | | | | | | | | |
| MinorTitle | | | | | | | | |
| Major Subhead | | | | | | | | |
| MinorSubhead | | | | | | | | |
| Banner One | | | | | | | | |
| Banner Two | | | | | | | | |
| Section Banner | | | | | | | | |
| Caption | | | | | | | | |
| Cutline | | | | | | | | |
| Display Callout | | | | | | | | |
| Flash | | | | | | | | |
| Corporate ID | | | | | | | | |
| Notation | | | | | | | | |
| Address 272 | | | | | | | | |

GENERIC FONT SCHEME

FIG. 6

| COLOR SCHEME SLOTS | ATTRIBUTES | | | | | | |
|---|---|---|---|---|---|---|---|
| | Graphics Foreground | Graphics Fill | Text Foreground | Text Fill | Edge | Shadow | Between Columns | Between Components |
| Normal | | | | | | | | |
| Emphasis | | | | | | | | |
| DeEmphasis | | | | | | | | |
| Accent | | | | | | | | |
| Secondary Accent | | | | | | | | |
| Tertiary Accent | | | | | | | | |
| Page Color | | | | | | | | |

FIG. 7

| GRAPHIC SCHEME SLOTS 294 | ATTRIBUTES | | | | | |
|---|---|---|---|---|---|---|
| | Box Ornamen. | Reversal | Between Columns | Between Comps. | Dingbat Text | Dingbat Bullet |
| Small Comp. | | | | | | |
| Medium Comp. | | | | | | |
| Large Comp. | | | | | | |
| Repeated Comp. | | | | | | |
| Illustration | | | | | | |
| Page Outer | | | | | | |
| Page Inner | | | | | | |
| BodyText | | | | | | |
| BodyEmphasis | | | | | | |
| BodyEmphShrt | | | | | | |
| Body Lead | | | GENERIC GRAPHICS SCHEME | | | |
| DocumentTitle | | | | | | |
| MinorTitle | | | | | | |
| Major Subhead | | | | | | |
| MinorSubhead | | | | | | |
| Banner One | | | | | | |
| Banner Two | | | | | | |
| Section Banner | | | | | | |
| Caption | | | | | | |
| Cutline | | | | | | |
| Display Callout | | | | | | |
| Flash | | | | | | |
| Corporate ID | | | | | | |
| Notation | | | | | | |
| Address | | | | | | |

COMPONENT DEFINITION

| COMPONENT | FONT SCHEME SLOT | FONT SCHEME THRESHOLD | COLOR SCHEME SLOT | COLOR SCHEME THRESHOLD | GRAPHIC SCHEME SLOT | GRAPHIC SCHEME THRESHOLD |
|---|---|---|---|---|---|---|
| PRODUCT TITLE | MINOR TITLE | 4 | EMPHASIS | 4 | SMALL COMPONENT | 5 |
| PRODUCT BODY | BODY TEXT | 5 | NORMAL | 5 | LARGE COMPONENT | 5 |
| PICTURE CAPTION | BODY EMPHASIS | 3 | EMPHASIS | 3 | SMALL COMPONENT | 5 |
| PICTURE CUTLINE | BODY TEXT | 2 | NORMAL | 2 | SMALL COMPONENT | 5 |
| 302 | 304 | 306 | 308 | 310 | 312 | 314 |

320 — PRODUCT TITLE
322 — PRODUCT BODY
324 — PICTURE CAPTION
326 — PICTURE CUTLINE

FIG. 11

Holiday Color Scheme for Attribute Foreground Color

| SLOTS | LEVEL 1 | 2 | 3 | 4 | 5 |
|---|---|---|---|---|---|
| 503 — Normal | Black | Black | Black | Maroon | Red |
| 504 — Emphasis | Black | Black | Red | Red | Orange |
| 505 — Major Title | Black | Red | Red | Green | Green |

FIG. 12

Component Definition

| | Components | Color Scheme Slot | Color Scheme Threshold |
|---|---|---|---|
| 517 | Body Text | Normal | 5 |
| 518 | Title | Major Title | 4 |
| 519 | Product Title | Emphasis | 4 |

FIG. 13

Examples of User Settings and Results

| | Diversity | Amount | Body Text | Title | Product Title |
|---|---|---|---|---|---|
| 541 | 1 | 2 | Black | Black | Black |
| 542 | 1 | 5 | Black | Black | Black |
| 543 | 3 | 5 | Black | Red | Red |
| 544 | 4 | 5 | Maroon | Green | Red |
| 545 | 4 | 4 | Black | Green | Red |
| 546 | 5 | 5 | Red | Green | Orange |

FLEXIBLE SCHEMES FOR APPLYING PROPERTIES TO INFORMATION IN A MEDIUM

CROSS REFERENCE TO RELATED APPLICATIONS

The present application is related to U.S. patent application Ser. No. 08/745,557, entitled "Design Engine for Automatic Layout of Content", Ser. No. 08/709,649, entitled "Design Engine for Automatic Reformatting for Design and Media", Ser. No. 08/709,633, entitled "Design Engine for Fitting Content to a Medium", and Ser. No. 08/709,782, entitled "Design Engine with Tree and Component Structure", all filed on Sep. 9, 1996, and each of which is hereby incorporated by reference in its entirety. The present application is further a continuation of U.S. patent application Ser. No. 08/807,345, entitled "Flexible Schemes For Applying Properties For Information In A Medium," filed on Feb. 28, 1997 and issued as U.S. Pat. No. 6,278,462.

FIELD OF THE INVENTION

The present invention relates generally to the processing of data by a computer system. More specifically, the present invention relates to applying a flexible scheme technique to information within a particular medium.

BACKGROUND OF THE INVENTION

Since the introduction of PC-based layout and publishing software in the late-1980's, the explosive growth of this market has underscored graphic design as a vital component of effective business communications. The information explosion has resulted in hundreds of messages—many enriched with clip art, custom illustrations, and scanned images—vying for attention across a wide variety of media (print, electronic, multimedia, etc.). Businesses have a significant need to visually differentiate their documents above the market noise. Pages that emphasize content with minimal attention to formatting, illustrations, layout, and visual appeal, will no longer attract the attention of increasingly sophisticated business audiences. Business users competing for readers' time now place a premium on creating and publishing graphically attractive communications.

The proliferation of software tools, ready-made content (e.g., on-line photo libraries and CD-ROM disks of clip art), and desktop peripherals (e.g., color printers and scanners), have made attractive content and output affordable for anyone with a personal computer. In addition, the Internet has had a profound impact on both the breadth of content and distribution opportunities. However, producing professional-quality materials for disparate media, including the Internet, requires design expertise, a variety of authoring tools, and advanced computer skills; a rare combination among most business people. Home and small business users in particular—already taxed for time to cover multiple business roles—seldom have the time or the tools needed to enhance their design and computer expertise.

To assist in the creation of materials, a number of word processing programs, desktop publishing tools, Internet authoring tools and the like have been developed. Many of the word processing programs allow the user to include tables, columns, pictures, rudimentary graphics, etc., within a document. However, these programs are typically not designed to easily facilitate the incorporation of professional looking design styles. Whereas a professional designer may find it relatively easy (albeit time consuming) to design a document having a professional looking and a coordinated set of fonts, colors and graphics (for example), such a result is beyond the reach of the typical personal or business user. Typical users know that they would like to be able to produce a design having a particular look in terms of fonts, colors, graphics, paragraph styles, etc., but lack the professional skills needed in order to produce a professional looking document in a short space of time.

For example, a typical user who is creating a document, web page, computer user interface or the like, may wish to produce a document having a "traditional" business like font scheme, but may not have the practiced eye of a professional layout designer in order to choose the correct font for their document title, the body of the text, its captions, etc. A profession designer would be able to choose appropriate fonts for each of these parts of the document that go well together. The typical user, though, has no such expertise.

In a further example, a user may wish to produce a web page having a rather subdued color scheme appropriate for a corporation. The average user may not be able to choose appropriate colors for different parts of the web page that go well together, as would a professional graphic artist. Further, another user who is creating a newsletter for a local club may wish to provide a certain whimsical style to the graphic elements of the newsletter, but may lack the skills of a professional graphic artist in choosing appropriate styles for the graphic elements of the newsletter such as boxes, ornamentation, backgrounds, or borders.

To address this need, certain software programs provide very rudimentary color or font settings for a document, but these lack flexibility and have other drawbacks. For example, recent versions of the WINDOWS operating system available from Microsoft Corporation of Redmond, Wash., allow a user to choose different colors for desktop items on the computer screen. Within WINDOWS, a user may choose the "gaudy" colors and receive a matched set of gaudy colors for all of the items on his or her desktop computer screen. However, this choice of particular colors for items is very rudimentary and has no flexibility. Each item is assigned a particular color and the user may not easily experiment or select from a coordinated set of a range of possible colors for the items. And because each item on the screen is assigned a particular color, should the user change to different colors, the relationship between items on the screen and their colors are lost. For example, if the color designer wished the border of a document to always be two shades brighter than the background, he or she would have to program (or "hard wire") this preference into each and every set of colors. Even worse, if the component designer of the components on the screen wanted the border component to always be two shades brighter than the background component, he or she would have to coordinate with the color designer, and oversee his or her work in order to make sure that the colors always made the border two shades brighter. Also, a user is not able to indicate that he or she desires more items being in color, or desires a greater variety of colors within a particular color setting.

In a further example of rudimentary settings, recent versions of Microsoft Word allow a user to define a particular style for a paragraph or a document. This defined style may then be applied to other paragraphs or documents. However, like the colors described above, this definition of a style does not allow a user to incrementally vary the look of a particular style in order to achieve a finer grained control over a given style. Also, the elements of a document rendered in a particular style are not coordinated. In other words, the styles do not allow relationships between elements of a document to be defined and maintained as a user switches from style to style.

In general, existing techniques for applying particular settings to a document are not flexible enough to allow the user greater control in choosing variations of a particular setting. Also, these existing techniques do not always allow the user to apply a particular setting at all levels of a document ranging from a particular word or heading, on up to the complete document itself. In addition, these techniques do not establish and maintain relationships between parts of a design that can be maintained when a particular setting changes. Therefore, a technique is desired that would remedy the above drawbacks in document production and that would bring the skills of professional designers and graphic artists to the fingertips of the average user.

SUMMARY OF THE INVENTION

To achieve the foregoing and other objects, and in accordance with the purpose of the present invention, a flexible scheme data structure and technique is disclosed that allows an average user to easily apply professional quality schemes to a variety of media.

In one embodiment of the invention, a scheme instance data structure is used for applying a set of coordinated attributes to any number of components within a composition. The data structure includes a scheme instance category indicating a type of scheme and a number of attributes corresponding to the scheme instance category. Also included are a number of scheme slots, and each scheme slot is associated with zero or more components of the composition. Each of the scheme slots is also associated with each of the attributes. In other words, each scheme slot is arranged to hold a distinct value for each of the attributes. In this fashion, for each of the scheme slots, the scheme instance data structure may be used to apply values of attributes to the components of the composition associated with each scheme slot. In a further embodiment, a scheme instance includes a number of levels, each level having a complete set of values for the attributes.

In another embodiment of the invention, a method of applying a scheme to a number of components in a composition uses a scheme instance data structure as described above. The method includes various steps, including receiving a chosen scheme instance category and receiving a chosen scheme instance name indicative of the scheme instance associated with the chosen scheme instance category. Once a scheme instance is indicated, a value is determined for a scheme attribute for one of the scheme slots using the scheme instance. Next, the determined value is assigned to one of the components in the composition associated with the scheme slot. In this fashion, the component takes on a characteristic consistent with the scheme instance.

Among other advantages, an embodiment of the present invention allows a user to apply a coordinated set of properties to a collection of objects within a composition such as a document. These coordinated properties define professional looking relationships between objects in a document, such that if a new scheme is applied to the document, the professional looking relationships between the objects remain. In addition, these coordinated properties are independent of a specific design. For example, a set of colors that look pleasing to the eye for a newsletter may also be applied to a business memorandum. Also, a particular scheme may be applied at a different granularity within a document such as to a particular element, a particular product grouping, a given page, or the complete document. Furthermore, the user is supplied with tools that allow him or her finer grained control in adjusting levels within a particular scheme. For example, for a particular color scheme, the user may easily adjust this color scheme incrementally from a "subdued" version to a "gaudy" version of that color scheme.

DESCRIPTION OF THE DRAWINGS

The invention, together with further advantages thereof, may best be understood by reference to the following description taken in conjunction with the accompanying drawings in which:

FIG. 3 illustrates an example of a Traditional font scheme according to an embodiment of the present invention.

FIG. 4 illustrates an example of a Holiday color scheme according to an embodiment of the present invention.

FIG. 5 illustrates an example of a Festive graphic scheme according to an embodiment of the present invention.

FIG. 6 illustrates an example of a font scheme structure.

FIG. 7 illustrates an example of a color scheme structure.

FIG. 8 illustrates an example of a graphic scheme structure.

FIG. 9 illustrates a component definition arrangement according to an embodiment of the present invention.

FIG. 11 illustrates a portion of a color scheme with levels for a particular attribute of that color scheme.

FIG. 12 illustrates a component definition arrangement for use with a color scheme according an embodiment of the present invention.

FIG. 13 illustrates possible user settings for a color scheme and their results according to an embodiment of the present invention.

DETAILED DESCRIPTION OF THE INVENTION

Figure 14A:
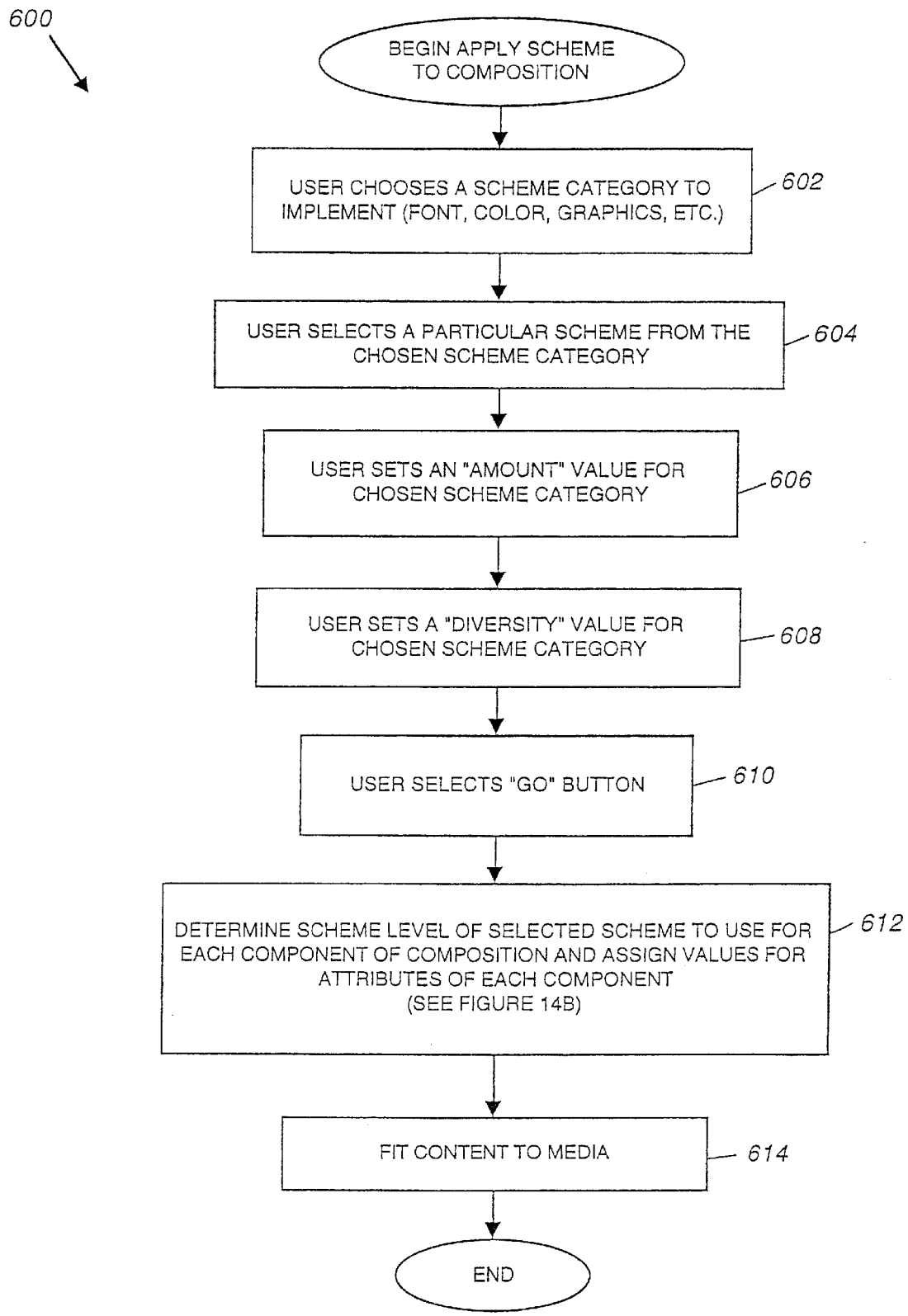
FIG. 14A is a flowchart for applying a particular scheme to a composition according to an embodiment of the present invention.
Figure 14B:
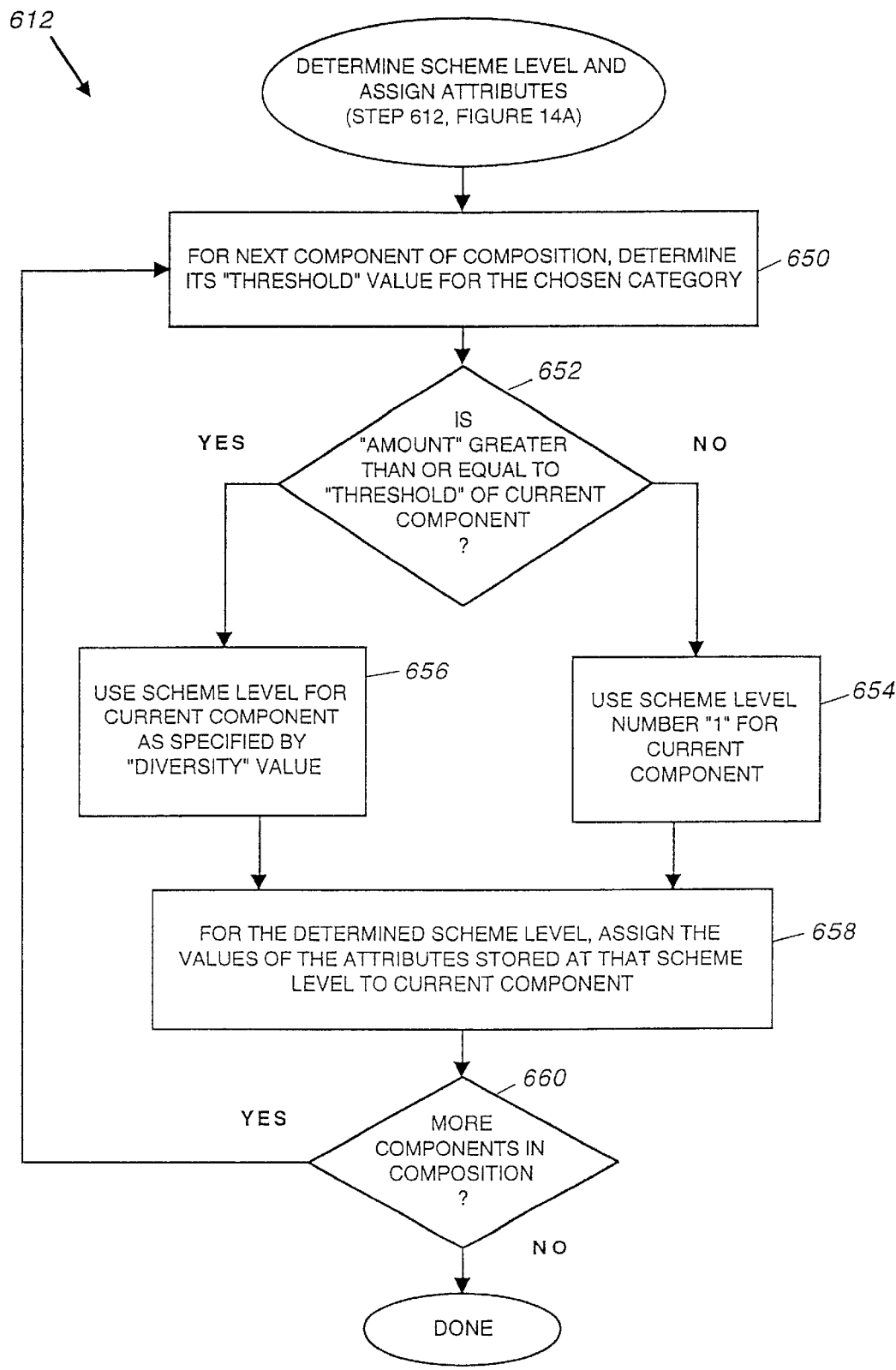
FIG. 14B is a flowchart describing an embodiment for the determine scheme level step of FIG. 14A.

The present invention provides a structure and technique for use with a wide variety of types of schemes that give the average user greater control over the appearance of the schemes, yet incorporate professional looking relationships within a particular scheme that allow the average user to produce a professional looking document quickly and easily. In one embodiment of the invention, individual components are not directly associated with attributes of a given scheme, but are grouped into categories and assigned to a particular scheme slot which itself is directly associated with assigned attributes. This additional level of indirection for the individual components allows relationships between components to be defined and maintained. In another embodiment of the invention, sliders are provided for each scheme that allow the average user to incrementally vary the effect of a particular scheme. FIGS. 1 through 8 provide examples of particular font, color and graphic schemes and their uses according to one embodiment of the present invention. FIGS. 9 through 13 illustrate the use of different levels within a particular scheme, and how the use of sliders allow a user to choose a particular level. FIGS. 14A and 14B illustrate one technique for applying a particular scheme to components within a composition.

Component and Composition Examples

Figure 1:
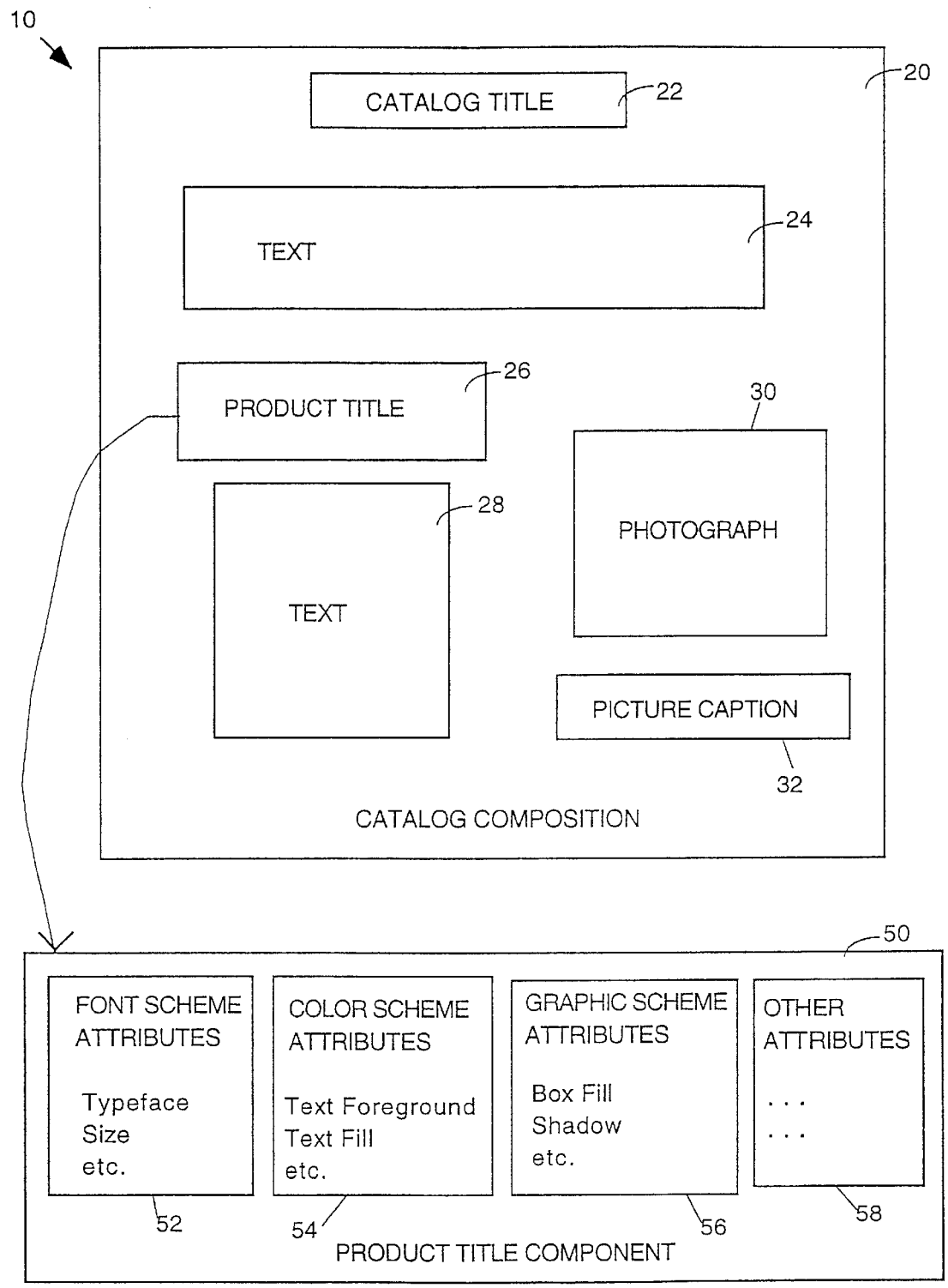
FIG. 1 illustrates an example of a catalog composition having a Product Title component to which an embodiment of the present invention may be applied.

Turning now to FIG. 1, shown is an arrangement 10 in which a user has created a Catalog composition 20 that makes use of various schemes according to one embodiment of the present invention. Catalog 20 has a Catalog Title 22, introductory Text 24, a Product Title 26 for a particular product in the Catalog 20, Text 28 associated with that product, a Photograph 30 of the product, and a Picture Caption 32 describing the Photograph 30. In one embodiment of the invention, Product Title 26 is represented as a Product Title component 50 having various schemes associated with it. In this example, a user has created a simplistic catalog that uses font, color, graphic and other schemes according to one embodiment of the present invention. As will be explained in greater detail below, it should be appreciated that a user may take advantage of the schemes of the present invention while such a catalog is in the process of being created, or even after such a catalog has been completed by the user.

Such a catalog or other composition may be created using a wide variety of software tools and still be able to take advantage of the present invention. By way of example, in one embodiment of the present invention, the composition and component structure and the object-oriented programming techniques use to implement a composition may be as disclosed in U.S. patent application Ser. Nos. 08/745,557, 08/709,649, 08/709,633 and 08/709,782 referenced above. Furthermore, Catalog composition 20 created by the user may be created for use with a wide variety of media. By way of example, Catalog composition 20 may be intended as a printed document, a web page on the Internet or an intranet, a display screen of a computer, or any other suitable media.

Catalog 20 may be termed a catalog composition. A composition typically combines content, design and media in a usable form. In general, content is information substance, in forms such as communication-bearing text, images, symbols, data structures and other. Media, in general, is presentation space, in forms such as paper, sequenced computer screens, linked hypertext pages and other. A design is typically information presentation specifications, in forms such as definitions of allowable content and media combinations, and methods for rendering presentations of particular content to particular media. Thus, a composition may be viewed as a combination of compatible content, media, and design objects capable of producing a specific presentation of specific information in a specific form. A composition typically results from a request to render a media-specific presentation of an open document.

A composition may be viewed in different ways. In one aspect, the persistent, storable form of a composition is referred to as a document. A document may be stored in many forms. By way of example, a document may be a computer file (or other long-lived object) designed to serve as the basis for a composition. The concepts of a composition and a document are closely related. However, while a composition—a specific configuration from which a presentation is rendered—may fully specify target media and an explicit layout, a document is likely to leave these properties unresolved so as to support different user choices at different times. A document object may support presentations to a wide variety of supported media; this generally corresponds to the user's notion of an identifiable publication. In other words, a document is typically a persistent object that may support multiple media, while a composition typically represents a single media presentation.

Elements within a composition may be represented in a wide variety of manners. By way of example, elements within Catalog composition 20 such as Product Title 26 are represented as components within a particular software tool. In the problem domain view a component is a coherent entity within a document or composition that can be independently created and destroyed, inserted and removed, and/or changed in state; the entire document or composition is considered to be such a component. And in the software architecture view a component is a software object representing such an entity.

The most typical component is a straightforward document part such as a paragraph, list, illustration, or article. The component concept may also be generalized to cover document and component "blanks" on a palette (place holder content), and entire documents and compositions. The component concept thus provides a common representation that brings entire documents and compositions, intermediate-level objects, primitive content elements, and media into a single, interconnected structure.

As shown in FIG. 1, Product Title 26 is represented as a Product Title component 50. A component may take advantage of a wide variety of schemes. By way of example, Product Title component 50 is associated with a font scheme 52, a color scheme 54 and a graphic scheme 56. Each scheme may provide a wide variety of attributes used to define the characteristics of a particular component. By way of example, a font scheme may define the typeface, size, emphasis, spacing, etc., of a component such as text. A graphic scheme may define attributes such as background fill, borders, shadows, embellishments, etc., for a component such as a photograph or box. A color scheme may define attributes such as text foreground, text fill, etc., for any component. And a paragraph scheme may define attributes such as indentation, justification, space between paragraphs, etc., for components that are paragraph text in particular. Many other different types of schemes may also be defined and used with the present invention as is disclosed herein.

In particular, Product Title component 50 has various attributes through the font, color and graphic schemes that define characteristics of Product Title 26. For example, font scheme attributes typeface and size define the look of Product Title, color scheme attributes text foreground and text fill define the color appearance of Product Title, and graphic scheme attributes box fill and shadow further define a graphic look for Product Title. As will be appreciated by those of skill in the art, other attributes 58 may be associated with Product Title component 50 that are either associated with another scheme or are independent of a particular scheme. Also, Product Title component 50 may define or be associated with other settings, values, methods, procedures, etc., that help to define the characteristics and function of Product Title within the Catalog composition.

Although not shown in FIG. 1, the other elements of Catalog composition 20 may also be represented as components and be associated with various font, color, graphic or other schemes. In other embodiments of the invention, a particular scheme or set of schemes may be associated with the top level Catalog composition itself, and each component within the catalog composition would then be able to inherit the various scheme attributes by way of being associated with the catalog composition. Furthermore, a scheme or group of schemes may be associated with a mid-level component, and low-level components located below the mid-level component in a suitable hierarchy would then inherent scheme attributes from the mid-level component. In addition, although particular scheme attributes and their values may be inherited by a particular component from a higher level component, it is contemplated that low-level components may be able to locally override inherited scheme attributes and/or values.

Furthermore, the present invention is advantageous in that should the design of Catalog composition 20 change, or should the media to which it is to be rendered change, Product Title 26 could still be associated with its particular font, color and graphic schemes. This feature allows particular schemes to be reusable independent of a specific design or medium.

Schemes Database Example

Figure 2:
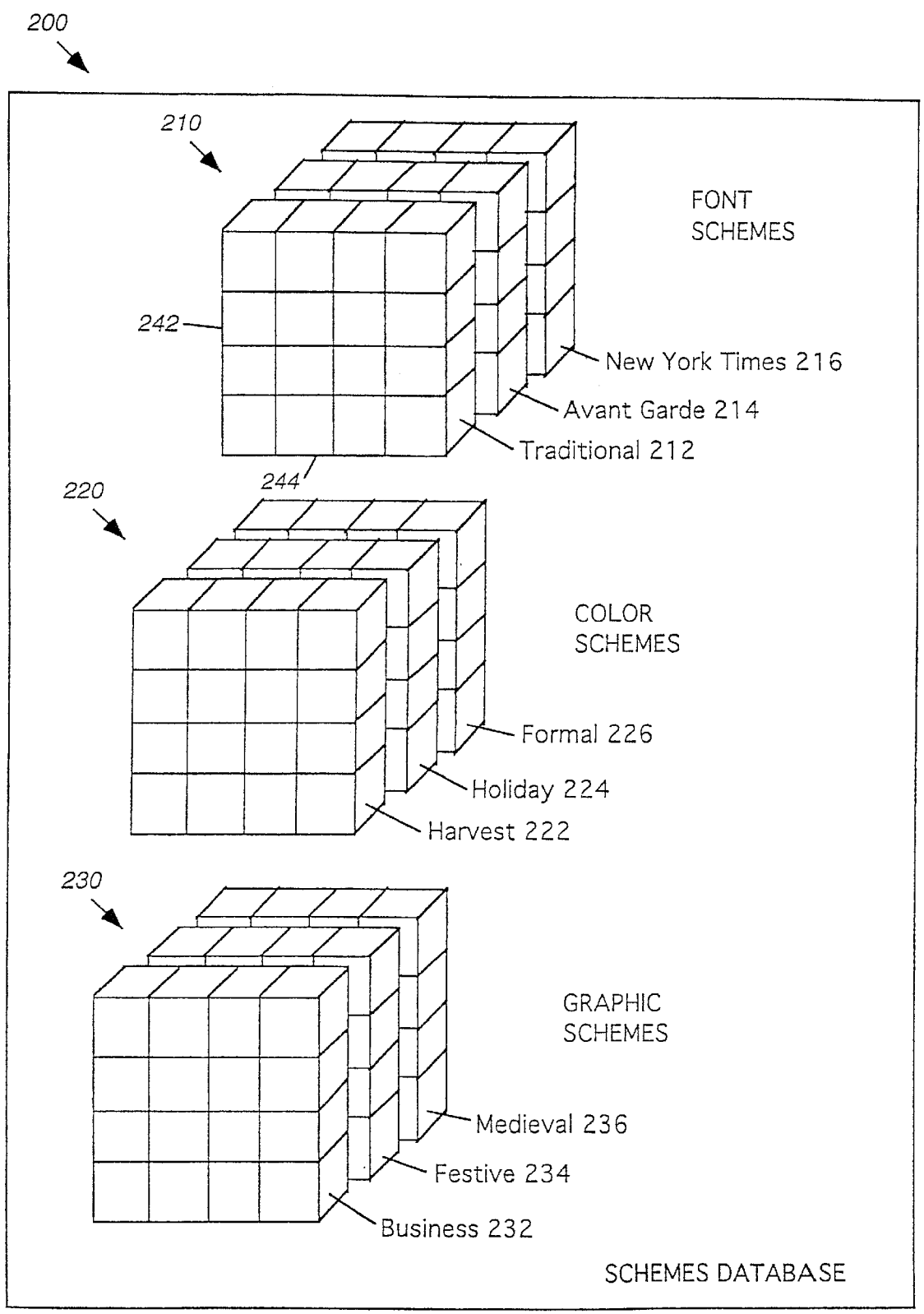
FIG. 2 shows symbolically a schemes database having various font schemes, color schemes and graphic schemes according to an embodiment of the present invention.

Now having described in general how a particular scheme and its attributes may be associated with an element of a composition, an implementation of schemes according to an embodiment of the present invention will now be described. FIG. 2 illustrates an embodiment in which various schemes are stored within a schemes database 200 of a computer system. Schemes database 200 includes various font schemes 210, a number of color schemes 220, and a group of graphic schemes 230. Other types of schemes may also be included within the schemes database. Schemes database 200 may be stored locally on a user's computer, may be available on a server computer within a local area network, or may be available over a network connection such as the Internet. Additionally, schemes database 200 may be implemented in a wide variety of manners.

As shown in FIG. 2, Traditional font scheme 212 is symbolically represented by rows of scheme slots 242 and columns of attributes 244. Each of the other schemes also shares this structure. The details of the use of these slots and attributes within the context of a particular scheme will be explained below with reference to FIGS. 3, 4 and 5.

Various particular schemes and their uses will now be described in detail. Font schemes 210 include a Traditional font scheme 212, an Avant-Garde font scheme 214 and a New York Times font scheme 216. Color schemes 220 include a Harvest color scheme 222, Holiday and Formal color schemes 224 and 226. Graphics schemes 230 include a Business scheme 232, a Festive scheme 234 and a Medieval scheme 236. Each of these schemes provides a particular look to an element of a composition, a portion of a composition, or to the composition itself. For example, by choosing the New York Times font scheme, the user is assured of producing a professional quality composition having a font style reminiscent of the New York Times. By choosing a Harvest color scheme, for example, the user is able to take advantage of harvest colors for his or her composition that have been chosen by a professional designer to create a professional looking document with those colors. When the user chooses to apply a Business graphics scheme to his or her document, the user is assured that the graphics applied to his or her document will be in a professional business style. A user creating a composition may choose and use these schemes as will be described in greater detail below with reference to FIGS. 14A and 14B.

In an embodiment of the invention, the schemes within the schemes database 200 have been selected and designed by a professional scheme designer. For example, the Traditional font scheme may be designed by an individual with experience in publishing. Any one of the color or graphic schemes may be designed by a professional graphic artist. However, it is also contemplated that an end user of the schemes database may also be able to make adjustments to a particular scheme or even design their own custom scheme. As discussed above, the schemes of the present invention work well with and may be bundled with a wide variety of software applications. In one embodiment of the invention, the schemes are predefined and are packaged along with a software product to be available for use by an end user. In a preferred embodiment, such schemes are available for use with the software product "i publish" available from Design Intelligence, Inc. of Seattle, Wash., as described in U.S. patent application Ser. Nos. 08/745,557, 08/709,649, 08/709,633 and 08/709,782 referenced above.

Examples of Specific Schemes

FIGS. 3, 4 and 5 illustrate specific examples of schemes that may be produced by a scheme designer for eventual use by an end user. Respectively, FIGS. 3, 4 and 5 illustrate embodiments of a Traditional font scheme 240, a Holiday color scheme 250, and a Festive graphic scheme 260. Each of these specific schemes is also termed a scheme instance because it is a specific instantiation of one of the categories of schemes. For example, a font scheme is one category of scheme, while a Traditional font scheme is an instance of a font scheme. Schemes in general, and scheme instances 240, 250 and 260 in particular may be stored and accessed within a computer system in a wide variety of manners. By way of example, the scheme instances may be stored in a table like format as shown. Of course, many other methods and data structures for storing the needed information are possible.

Schemes of the present invention make use of scheme slots associated with attributes in order to provide distinct advantages. In FIG. 3 the Traditional font scheme associates font scheme slots 242 with attributes 244. Likewise, in FIG. 4, the Holiday color scheme associates color scheme slots 252 with various attributes 254. Similarly, the Festive graphic scheme of FIG. 5 associates graphic scheme slots 262 with a number of attributes 264. Assigning scheme slots (such as scheme slots 242, 252, and 262) to sets of attributes instead of assigning individual elements to sets of attributes has distinct advantages over the prior art as is described below. A more detailed description of possible slots and attributes for font, color and graphic schemes will be discussed below with reference to FIGS. 6, 7 and 8.

The use of slots in conjunction with attributes will now be explained in more detail with reference to FIG. 3. Unlike the prior art in which a specific element of a composition (such as a particular word, paragraph, column, picture, table or other) was associated directly with a group of a font attributes (such as typeface or size), the present invention associates a more abstract category called a "slot" with a group of attributes. For example, in the prior art, font settings might be applied to a paragraph by assigning attributes such as typeface and size to that particular paragraph in a document. Traditional font scheme 24 (for example), however, associates a font scheme slot called Bodytext with a group of font attributes such as typeface, size, bold and italic. Individual paragraphs (or other components) are then assigned to the font scheme slot Bodytext. In this fashion, the font scheme slot Bodytext can serve as a place holder for any number of components that all wish to share these same values for a set of font attributes. This is advantageous in that a number of components can be assured of sharing the same attributes and values, even if those attributes and values are changed.

Individual components may be assigned to, or associated with scheme slots in wide variety of manners. By way of example, one technique for assigning a particular component to a slot in a scheme will be discussed in greater detail below with reference to FIG. 9. When the designer of a component defines that component, the component is also assigned a particular slot in a font scheme, a color scheme, a graphic scheme or other. For example, if a particular text component in a document is assigned to the font scheme slot Bodytext 246 of FIG. 3, then that component would use the typeface Times, its type size would be "12" and the text would not be in bold nor in italic. By contrast, if another component is assigned to the font scheme slot Body Emphasis 247, it would appear just like the previous component assigned to the slot Bodytext, except the second component would be in bold. Also, a title of a document assigned to the Document Title slot 248, would have a font of Arial, a type size of "20", and would be in bold but not in italic. In addition, any subheadings throughout the document might be assigned to the slot Minor Title 249, in which case they would appear just as the main title of the document except that the type size would be "14" instead of "20".

Additionally, component instances can be assigned to specific slots by explicit or implicit decision of a user through manipulation of a user interface. Such assignment can override application of component type driven defaults. For example, if a component type were assigned to a particular slot upon component definition, it may be possible for that assignment to be overridden at the component instance level.

Use of the font scheme slots Document Title 248 and Minor Title 249 illustrate an advantage of the present invention. The designer of Traditional font scheme 240 of FIG. 3 has designed it so that any components assigned to the slot Minor Title will appear exactly as the main document title of the document, except that they will be smaller in size. This relationship is important to maintain for aesthetic reasons. A scheme designer may also define many other font schemes such as Avant-Garde, New York Times, etc., that all maintain a particular relationship between the Document Title slot and the Minor Title slot. In other words, a skilled scheme designer will design a font scheme so that the slot Document Title and Minor Title correspond to one another in a pleasing fashion. This relationship is transparent to the user. Thus, by simply assigning subheadings to the slot Minor Title and the main title of the document to the slot Document Title, the component designer is assured that there will be a pleasing aesthetic relationship between the subheadings and the main title. This benefit of slots applies to any scheme.

FIG. 4 shows a Holiday color scheme 250 having color scheme slots 252 and an a associated group of attributes 254. A more detailed description of possible slots and attributes for a color scheme will be discussed below with reference to FIG. 7. Normal slot 256 is provided for those components that a component designer wishes to appear in a "normal" manner. Emphasis slot 257 is for those components that will be visually emphasized, while DeEmphasis slot 258 is reserved for those components that a component designer does not wish to emphasize as much. Accent slot 259 is used with components that will have an accent specific to the scheme instance ("Holiday" in this case).

For example, a component designer may assign regular text components to the Normal slot, heading components to the Emphasis slot, footnote components to the DeEmphasis slot, and major headings and picture captions to the Accent slot. In this fashion, particular components are assigned to various color scheme slots which in turn are associated with the group of attributes 254. Changes to either the group of attributes or their values can occur without any change in the relationship between the components and the slots to which they have been assigned.

FIG. 5 illustrates a Festive graphic scheme 260 having graphic scheme slots 262 and a set of attributes 264. A graphic scheme might be used to impart a particular look to graphic elements of a document such as boxes, graphs, pictures, lines, borders, etc. By way of example, such a Festive graphic scheme might be used by an individual to give a document such as a party invitation a festive look. A more detailed description of possible slots and attributes for a graphic scheme will be discussed below with reference to FIG. 8.

The graphic scheme slots Small Component 266, Large Component 267, Illustration 268 and Margins 269 are examples of slots that might be used in a graphic scheme. For example, smaller elements of a document such as small boxes, graphs, etc., might be assigned to the slot Small Component. Pictures and illustrations might be assigned to the slot Illustrations. For example, a small box within a document that is assigned to the slot Small Component would have a particular type of texture fill, would have a particular graphic border for its edges, would have no shadow, and any line between these smaller components would be a single rule with round end caps. By contrast, any box assigned to slot Large Component would have no fill and would have a double rule for its edges. A picture assigned to the slot Illustration, on the other hand, would have no fill, would have a triple rule for its edges, and would have a shadow that is offset towards its bottom and to the right. Thus, in this fashion a scheme designer has set up a particular Festive graphic scheme and has identified slots such as Small Component, Large Component, etc., that take on various festive style attributes and values. A component designer is then able to assign a particular component to one of the graphic schemes slots and thereby take advantage of the festive style attributes and values that have been set up by the scheme designer.

Although certain of scheme slots discussed above and those to be discussed below with reference to FIGS. 6, 7 and 8 are closely identified with component types, a scheme slot could be very generic. For example, although scheme slots such as "Banner" and "Document Title" are closely related to component types assigned to these slots, other slots much more generic in nature such as "Normal", "Hot Color", "Cool Contrast", "Large Component" are possible.

Examples of Generic Scheme Structures

Turning now to FIGS. 6, 7 and 8, embodiments of detailed generic schemes that may be used are described. FIG. 6 is an example of a generic font scheme that might be used by a scheme designer to produce a particular font scheme instance such as Traditional or New York Times. Generic font scheme 270 includes font scheme slots 272 and a set of attributes 274. It should be appreciated that a wide variety of other slots and attributes may be used for a font scheme. The meaning and uses of these font scheme slots and attributes will now be described in detail. The attribute typeface refers to a typeface such as Times, Helvetica, Geneva or any other typeface. The attribute minimum font size refers to the smallest point size suitable for that slot. Likewise, the attribute maximum font size indicates the largest point size that is suitable. Nominal font size refers to a point size that produces the best looking type. The attributes bold, italic and small capitals respectively indicate whether a component will appear in bold, italics or small capitals. The attribute leading indicates an appropriate number of points of leading between lines.

Font scheme slots 272 are illustrative of types of slots that encompass various types of components. In other words, each font scheme slot attempts to generalize for certain types of components that may be present within a document. By understanding how a given slot name is generalized and what it refers to in a document, a component designer is able to assign created components to a particular slot in order to take advantage of a particular font scheme. For example, the slot Body Text encompasses most of the text components and will most likely apply to the largest area of the document. The slot Body Emphasis includes those components within the body text that stand out, e.g., price information on a catalog sheet. Slot Body Emphasis Short refers to a word or phrase within the body text that is meant to stand out. It most likely will be in all capitals or a similar treatment that is not suitable for longer text. The slot Body Lead is typically the first paragraph of the body text. Document Title indicates the title of the entire document, whereas slot Minor Title refers to the title of content for any component within the document. The slot Interior Major Subhead is for subheadings within content and is a level of emphasis below the slot Minor Title. Slot Interior Minor Subhead is similar and is two levels of emphasis below Minor Title. The slots Banner One and Banner Two refer to fonts used in the composition. Slot Section Banner indicates a section or department heading and may be visually related to Banner One and Banner Two, but in a smaller size.

The slot Caption is used for those components which are title of pictures. Similarly, the slot Cut Line is used with components that are descriptive text for a picture. The slot Display Callout is used for a pull quote or similar. For advertising and for attention getting components, the slot Flash is used. A Corporate Identification slot is used for unique and separable components. The slot Notation is used for components that are notes, annotations and other descriptive text that is likely to be slightly smaller than the body text. The slot Address is used for components that typically contain the name and address of an entity.

FIG. 7 illustrates an example of a generic color scheme 280 having color scheme slots 282 and a set of attributes 284. The attributes graphics foreground and graphics fill refer respectively to the color to be used for the graphics proper and for their backgrounds. Likewise, the attributes text foreground and text fill refer to the color to be used for the text proper and the background for that text. The attribute edge indicates a color to be used for an edge of a graphic, while the attribute shadow indicates a color to be used when a component has a shadow associated with it. The attributes between column and between components refer to colors that may be used between columns of a document or between components of a document.

Slots 282 for a color scheme indicate generalized groupings into which particular components will fall based upon how the component designer wishes a particular component to appear. For example, for a component that should appear with normal colors, that component will be assigned to the slot Normal. On the other hand, components that should be emphasized using color or de-emphasized using color, would be assigned to either the slot Emphasis or the slot DeEmphasis. The slot names Accent, Secondary Accent and Tertiary Accent are used for those components that will not be emphasized but should have some color accent associated with them. The slot Page Color is used for components taking on the color of the page. Thus, a component designer is able to make use of a color scheme designed by a scheme designer by assigning individual components to a particular color slot name. Also, more or different slots and attributes could be used.

FIG. 8 illustrates an example of a generic graphic scheme 290 having graphic scheme slots 292 and a set of attributes 294. The attributes 294 for a graphic scheme allow a scheme designer to design a particular graphic look for a particular slot by assigning values for these attributes for that particular slot. For example, the attribute box ornamentation indicates how a box will look. The definition of this attribute requires various values. One aspect of the attribute box ornamentation indicates a particular fill for the box which may be a textured map or may be null. Also, each of the edges of the box is further defined by a ruling specification or may also be null. A shadow is also defined for a box and may indicate a bottom offset or a right offset.

A ruling specification defines how lines will appear. A ruling specification is typically used with an edge of a box. A ruling specification includes values for the space between lines, the thickness of lines and their lengths. A ruling specification may also indicate a single line, a double ruled line, a triple ruled line or more. Each of these lines within a ruling specification will also have a line specification defining that line. For example, a line specification defines whether a line has end caps and of which type, whether the line is dotted, dashed or continuous, whether the line includes a bit map, etc. A more complex implementation could specify bit maps for the lines and ends.

The attribute reversal indicates reversal of graphics. The attributes "between columns" and "between components" indicate whether a line should be placed between columns or components and is defined by using a ruling specification. The attribute dingbat for text flow defines a beginning dingbat and an end dingbat for that text flow. The attribute dingbat for bullet defines one dingbat for use as a bullet within text.

The graphic scheme slots 292 of FIG. 8 are arranged to encompass various types of components that may be used in a graphic design. The slot names Small Component, Medium Component and Large Component refer to sizes of components that may be used within a document and have corresponding values for attributes that would be appropriate for that size of component. For example, a very small box component may not have a texture map for fill because the fill might be hard to read or reproduce. However, a large component may very well have a particular distinct texture map used for fill because it would be easy to read and/or reproduce this texture map for a large component. The slot Primary Repeated Component is used for products, stories, etc. The slot Illustration is used for any components that represent illustrations, pictures, photographs, etc. The slot Page Outer indicates the margins of a document, while the slot Page Inner refers to the live area within the margins of a document. The remaining graphic scheme slots Body Text through Address are the same slots as used and described in the generic font scheme of FIG. 6. These same slots appear in a graphic scheme because a designer may wish to apply graphic attributes to the types of components that are included in these slots. Also, more or different slots and attributes could be used.

Component Definition Example

Turning now to FIG. 9, an embodiment of a technique for associating each component with a slot of a particular scheme will now be described. It will be appreciated that components may be associated with slots and thresholds in a wide variety of manners. Also, the actual definition of a component (including defining its content, other attributes, methods, etc.) may be separate from this technique. FIG. 9 shows a component definition 300 that includes a group of components 302, font scheme slots 304, font scheme thresholds 306, color scheme slots 308, color scheme thresholds 310, graphic scheme slots 312, and graphic scheme thresholds 314.

Component definition 300 is an example of various components 302 that might appear in a product catalog sheet that a user is preparing (such as shown by way of example in FIG. 1). Although the user is preparing the catalog sheet, the definition of the components and their association with scheme slots is typically performed by the component designer. The end user makes use of particular components in a software product that have already been defined and associated with scheme slots by the component designer and/or the manufacturer of the software product. However, it is also contemplated that an end user might be able to reassign a component to a particular slot or may also change the threshold for a particular component. It should be appreciated that an individual component may be assigned to a scheme slot and a threshold value in a wide variety of manners. By way of example, FIG. 9 illustrates symbolically how components are associated with slots and threshold values.

One of the components 302, Product Title 320 (which represents the title of a product within a catalog sheet document), is assigned to the font scheme slot Minor Title indicating that it will have font attributes and values appropriate for the minor title of a document. Product Title 320 is also assigned to the color scheme slot Emphasis, indicating that the color of this component will be emphasized slightly more than normal. Also, Product Title is assigned to the graphic scheme slot Small Component which is appropriate for a smaller component such as a product title. On the other hand, Product Body component 322 (which represents the majority of text in a document) is assigned to font scheme slot Body Text, is assigned to the color scheme slot Normal (indicating that the body text for this document will appear more or less in a normal color—the dominant color for the composition), and is assigned to the graphic scheme slot Large Component.

Component Picture Caption 324 is given a font scheme slot of Body Emphasis in order to provide some emphasis for this caption, whereas component Picture Cutline 326 (which includes the text associated with the picture) is assigned to the font scheme slot Body Text which would not be emphasized. Correspondingly, component Picture Caption is assigned to the color scheme slot Emphasis which will give it a slight emphasis in color, whereas the Picture Cutline component is assigned to the color scheme slot Normal which will give it a normal color and not be emphasized.

The use of the threshold values shown in FIG. 9 will now be described. As will be described in more detail below with reference to FIGS. 10 through 14, a particular scheme such as a Traditional font scheme may have different levels associated with its set of attributes. In other words, an attribute such as typeface may have many slight variations of that typeface that can be selected by a user. These variations are termed levels. For example, although a Traditional font scheme may specify that a typeface of "Times" is to be used, this typeface may be adjusted slightly through the use of different levels for that scheme. A threshold value for each component indicates how difficult it is to change to another level in a particular scheme for that component. For example, a high threshold value indicates that a component is not likely to change to a different level within a font scheme, whereas a low threshold value indicates that a user may more readily change to a different level within that scheme.

For example, component Product Body is assigned a value of "5" for the font, color and graphic scheme thresholds, indicating that it is unlikely that the font, color or graphic scheme for Product Body would change unless the user is adamant about changing it. Such a high threshold is appropriate for the body text of a document because this major element of a document should not change too drastically too easily. On the other hand, component Picture Cutline (which is also assigned to the font scheme slot Body Text), only has a font threshold and a color threshold of "2", indicating that should the user desire, this component may change its font and/or color much more easily. Note that in this example, all of the components are assigned a graphic scheme threshold of "5", indicating that the graphic scheme for these components is unlikely to change.

A technique for utilizing this component definition 300 and the association between components, scheme slots and threshold values in order to produce components in a composition having a particular appearance will be described in greater detail below with reference to FIG. 14. First, the concept of scheme levels will be described in greater detail.

Scheme Levels

Figure 10:
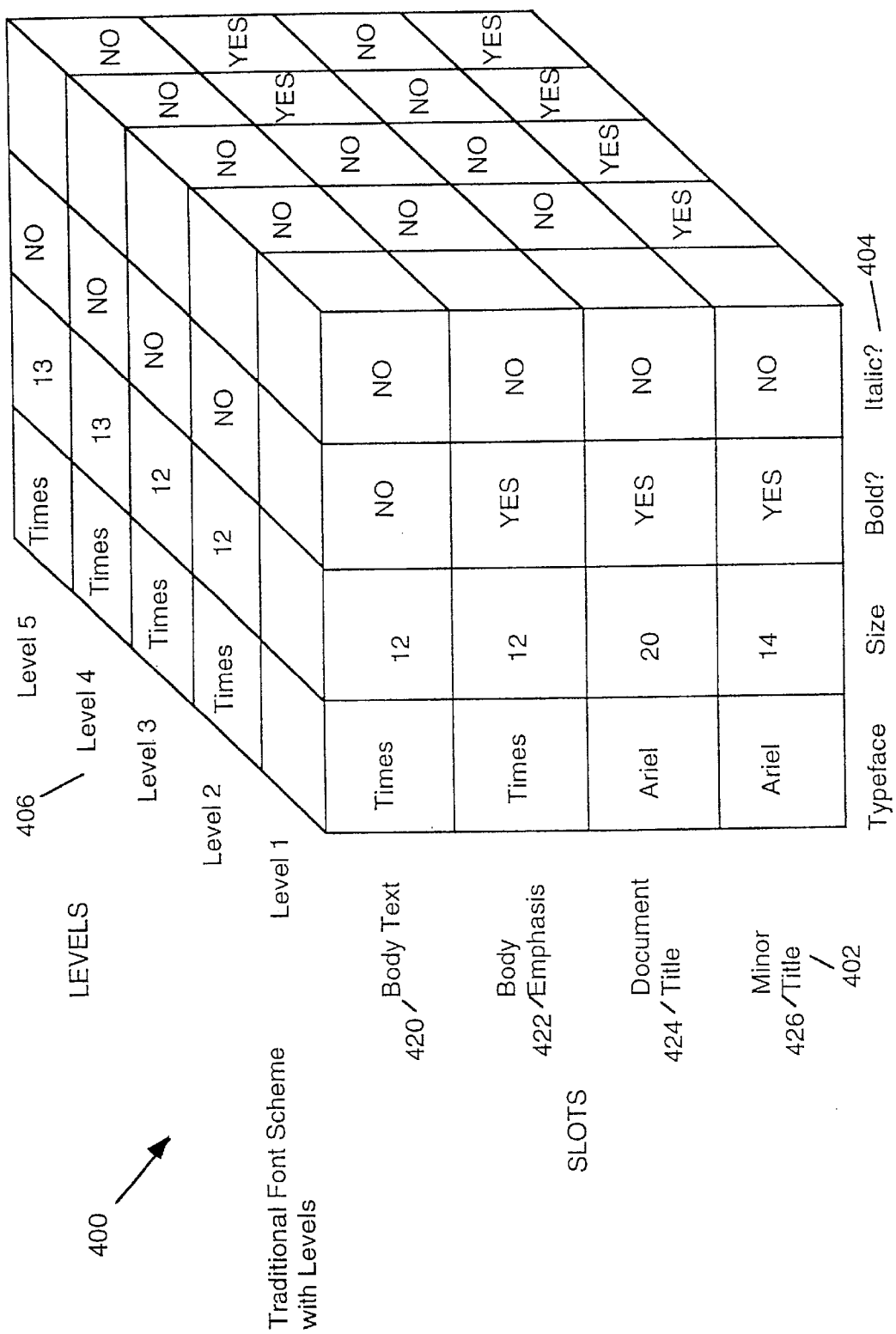
FIG. 10 illustrates a Traditional font scheme having various levels according to an embodiment of the present invention.

FIG. 10 illustrates an embodiment of a Traditional font scheme 400 with levels that includes font scheme slots 402, a group of attributes 404, and a series of levels 406. The concept of different levels associated with a particular scheme may be represented and implemented in a wide variety of manners. By way of example, levels for a particular scheme are symbolically illustrated in the structure as shown in FIG. 10.

Levels allow a scheme designer to introduce different values of an attribute for a particular scheme. For example, the slot Body Text 420 has a type size of "12" at Level 1, yet has a value for the type size of "13" at Levels 4 and 5. These levels do not necessarily represent different font schemes; they are included within the definition of the Traditional font scheme that is produced by a scheme designer.

In the Traditional font scheme 400 of FIG. 10, the attributes and their values for the slots shown at Level 1 are the same as for the Traditional font scheme 240 shown in FIG. 3. By expanding upon the Traditional font scheme of FIG. 3, and allowing different levels within the font scheme to hold different values for the same attributes, the notion of a Traditional font scheme is enriched and made more flexible. Although only five levels are shown in FIG. 10, it should be appreciated that any number of levels may be used within a scheme.

Levels within a scheme such as a Traditional font scheme allow for fine tuning of a particular scheme to fit a user's needs. While all of the values for the attributes in Levels 1 through 5 of FIG. 10 still correspond to what might be called a Traditional font scheme, nevertheless there are fine differences between the values of these attributes that allow for minute variations in a Traditional font scheme that may be desired by a user. By allowing a user to choose these levels, a user has greater flexibility in choosing a particular look for his document yet is still comfortable in knowing that he or she is operating within a Traditional font scheme that has been professionally designed.

Different levels within a scheme allow attributes to change gradually as one goes from level to level. For example, consider slot Body Emphasis 422 which is used for those components needing extra emphasis. In Level 1, this slot is characterized by a bold type but it is not in italics. Although not visible in the cube, one may assume that for all levels the value of bold for Body Emphasis slot 422 is always "yes" in order to appropriately emphasize a component. However, the value for the italic attribute is "no" in Levels 1, 2 and 3, presumably because bold is sufficient for emphasis and italics is not needed. However, should a user wish even further emphasis, Levels 4 and 5 provide a value of "yes" for the italic attribute for the Body Emphasis slot allowing a user to choose further emphasis for components assigned to this slot should it be desired.

Contrarily, consider the Body Text slot 420 of Traditional font scheme 400. In the example shown, the scheme designer has decided that the body text of a document should not change dramatically even for any level, note that for the attributes bold and italic, their values are always "no" for the Body Text slot for any level of the scheme. In addition, note that the typeface of "Times" is always the same for the Body Text slot for any level. However, the designer has allowed that the value for the attribute size for the Body Text slot changes from "12" to "13" in Levels 4 and 5. Although this change is slight and perhaps unnoticeable, it is still a variety that may be chosen by a user. On the other hand, those portions of a document that might change more readily but still may not affect the document dramatically may change more easily within the varying levels. For example, Minor Title slot 426 is not in italics in Level 1, yet for each of Levels 2 through 5 it does appear in italics.

It should be appreciated that the scheme designer may set values for attributes in the varying levels using any methodology or design decisions that she or he chooses. However, in one embodiment of the invention, proceeding from Level 1 to Level 5 produces a carefully designed series of changes in the values of attributes to produce a scheme that is slightly different, yet coordinated at each level. Take for example, Traditional font scheme 400 in FIG. 10. In one embodiment the scheme designer may choose Level 1 to indicate a Traditional font scheme that is in every sense, "traditional". The values for the attributes at Level 1 would reflect a font scheme that is traditional and conservative according to most readers. Level 2 through 5, would then provide slight variations on the Traditional font scheme ranging from conservative to modern. For example, if Level 1 could be characterized as the quintessential traditional font scheme, Level 5 might be characterized as a modem version of a traditional font scheme that "pushes the envelope". Thus, scheme Levels 2, 3 and 4 would represent a range between Levels 1 and 5. In this fashion, a scheme designer has produced a traditional font scheme for use by an individual that allows that individual to choose within a range of that font scheme and to vary it slightly. Of course, such a use of levels within a scheme is suitable for color, graphic and any other type of schemes. Such a use of levels allows a gradual change from perhaps a "normal" scheme at Level 1 to a more "daring" scheme at Level 5 for any category of scheme.

An example of using color schemes illustrates more benefits available to an end user. This example could be implemented using the approach shown in FIG. 10. Consider a system offering two color schemes to a user, "harvest" and "winter". Although these two color schemes would prove useful to a user, the user may wish to have a choice of a range of color schemes between the two available. For some applications, it may be too abrupt to simply either choose the "harvest" color scheme or "winter" color scheme. In other words, a user may need more flexibility than just a "harvest" color scheme and a "winter" color scheme. By providing the user with a "harvest" color scheme that includes many levels having variations on that color scheme, the user is provided with more flexibility in choosing a particular color scheme that meets his or her needs. For example, a user may wish to use a "harvest" color scheme, but may wish to add an accent that indicates a wintertime theme. In this fashion, the use of levels allows a scheme designer to provide a range of color schemes stretching from a "harvest" color scheme to a "winter" color scheme.

It should be appreciated that a user may be allowed to choose amongst different levels in a particular scheme in a wide variety of manners. One example of how a user may choose levels within a color scheme is described below with reference to FIGS. 11, 12 and 13. These figures illustrate one example of a Holiday color scheme and how a user may select from within various levels of that color scheme in order to achieve a particular look for a document. An embodiment of a general technique for choosing the level of a particular scheme and applying it to a given component is described in FIG. 14.

Scheme Level Example with Slides

FIG. 11 shows a portion of a Holiday color scheme 500 that only shows slots 502 and Levels 506 for one attribute of this color scheme, mainly the attribute foreground color. Of course, the scheme may have other attributes, but for this example, one is simpler to focus on. FIG. 12 shows a component definition 510 having various components 512, assigned color scheme slots 514 and assigned color scheme thresholds 516. This component definition 510 utilizes the defined slots 502 of FIG. 11. FIG. 13 is a table 520 illustrating examples of possible user settings and their results on the attribute foreground color. Table 520 has user specified values in a diversity column 522 and in an amount column 524. Results for the Body Text component are shown in column 526, results for the Title component are shown in column 528, and results for the Product component in column 530. The results for components shown in Table 520 are dependent upon the user settings of table 520, the component definition of FIG. 12 and the Holiday color scheme of FIG. 11.

Before each of the FIGS. 11, 12 and 13 are described in detail, the use of user settings in choosing a particular level for a component will be discussed. Although a particular level within a color scheme (for example a Holiday color scheme) may be chosen using a variety of techniques, in one embodiment the user specifies a Diversity value and an Amount value for a chosen scheme in order to select a particular level from within that scheme. For example, when a user first chooses a Holiday color scheme for use in a particular application, the user also specifies a Diversity value and an Amount value to indicate how he or she would like to customize that color scheme through the use of its levels.

These values of Diversity and Amount for a particular scheme are sometimes called "controls" or "sliders". In general, the Diversity value represents a greater variety of values available for attributes within a particular scheme. The Amount value indicates in general how many components within a document will be affected by that scheme. In one embodiment, a higher Diversity value means more variety for the components and a higher Amount value means more components will be affected by the particular scheme. Of course, other meanings and uses of these controls are possible, and user input may be used to choose a particular level in a variety of fashions.

For example, within a font scheme a Diversity value reflects how many distinctive fonts are available for the components. A higher Diversity value means that more distinctive fonts are available for use. An Amount value within a font scheme indicates the number of components that will appear in a font different than the body font. A higher Amount value indicates that more components will appear in different fonts and not necessarily in a standard font. For example, even if a Diversity value is quite low for a font scheme, and only two or three fonts are being used, a high Amount value will indicate that most all of the components will appear in one of these fonts instead of all appearing in one standard, body font.

For a color scheme a high Diversity value indicates that more different colors are available for the components to use. A high Amount value allows more components to be in color and produces a more colorful design. Of course, if the Diversity value is quite low, it may be that every single component has a color to it but that only two or three colors may be used. On the other hand, if Diversity and Amount are both quite high for a color scheme, this means that many different colors will be used and all components will have a color. In one example for a graphic scheme, a high Diversity value might mean that many different types of boxes are available for use by components, such as single line boxes, fuzzy line boxes, dashed line boxes, and double-ruled boxes. A high Amount value for a graphic scheme using this same example may indicate that most all components will have a box around them. Of course, these values for Diversity and Amount can have similar meanings for other schemes such as paragraph schemes, etc.

Thus, through the use of these sliders, a user is allowed to have very finely grained control over the use of different colors and how much color they desire (using a color scheme as an example). In addition, a user never has to pick out a specific component to be in color, nor has to pick directly a color for a component.

Returning now to a detailed discussion of FIGS. 11, 12 and 13, a portion of a Holiday color scheme 500 that shows possible values for one attribute foreground color is shown in FIG. 11. The attribute foreground color is the color in which various components such as text and title will appear. Only one attribute and three slots are represented in this FIG. 11 for simplicity of the example. Assuming that this Holiday color scheme were to be represented in a scheme cube such as shown in FIG. 10, the portion shown in FIG. 11 for the single attribute can be thought of that portion of the cube that would be seen were it to be viewed from the right hand side.

In this example, the scheme designer has implemented a Holiday color scheme that ranges from a conventional Holiday color scheme represented by Level 1 to a more extreme Holiday color scheme represented by Level 5. Levels 2, 3 and 4 represent a range of Holiday color schemes between the conventional and the extreme. The first slot Normal 503 serves as a category for any components that are normal portions of the text. Slot Emphasis 504 is the slot to which any components needing special emphasis will be assigned. Slot Major Title 505 is the slot to which any components of the document that can be considered major titles will be assigned. By turning now to an analysis of the color values for the attribute foreground color found in each of the levels, it can be seen how the Holiday color scheme progresses from the conventional to the extreme.

The Holiday color scheme at Level 1 indicates that any component assigned to one of the three slots will be in the black color. Although not shown, other slots may provide for different colors for this attribute. At Level 2, the Normal and Emphasis slots remain in black, whereas the Major Title slot now appears in red. At Level 3, any Normal slot component still appears in black, whereas any components assigned to the slots Emphasis or Major Title will now appear in red. At Level 4, any Normal component has changed from a black color to a maroon color, any component to be emphasized remains in the color red, and any Major Title component now will appear in the color green. In this fashion, it should be appreciated that the attribute foreground color is changing for a component assigned to these slots from a very conventional Holiday color scheme to a more extreme Holiday color scheme.

Finally, at Level 5 an extreme Holiday color scheme is represented. Any component assigned to the Normal slot will appear in the color red, any component to be emphasized appears in orange, and any major titles appear in the color green. It can be appreciated that a document having all elements of the text either in the colors red, orange or green might be considered a rather extreme Holiday color scheme. Thus, a user is able to simply choose Level 1 for a very conventional Holiday color scheme, Level 5 for a rather extreme Holiday color scheme, and any of Levels 2, 3 or 4 for a color scheme in between.

Turning now to a detailed discussion of FIGS. 12 and 13, a technique by which a user may specify which levels to use is disclosed. The component definition 510 of FIG. 12 defines a color scheme slot 514 and a color scheme threshold 516 for each component. In this example, the component designer has made available for use by the user the components Body Text 517, Title 518 and Product Title 519 among others. Component Body Text 517 has been assigned to the color scheme slot Normal which is shown as a slot 502 in FIG. 11. Also, component Body Text has been assigned a threshold value of "5". Component Title 518 has been assigned a slot Major Title and a threshold of "4". Component Product Title 519 has been assigned to the slot Emphasis and a threshold value of "4". The set up and definition of the color scheme 500 in FIG. 11 and the component definition in FIG. 12 makes it possible for the user to select levels for components using the sliders Diversity and Amount as will now be explained with reference to FIG. 13.

As explained above, the threshold value for a particular scheme for each component indicates how difficult it is to change a component from a conventional color scheme such as is found in Level 1, to a more extreme color scheme such is found in Level 5. A low threshold value for a component indicates that the color for that component may be changed more easily, while a very high threshold value indicates that it is more difficult for a user to change the color for that component. A component designer may set a very high threshold for a component, such as a threshold value of "5" for the Body Text component, in order to ensure that that component remains with the conventional color. Such a restriction might be important for a component such as Body Text which forms the major portion of a document. Other components that might not be as critical to the appearance of a document, such as a very small amount of text, may have a much lower threshold value.

As discussed above, once the user has chosen the Holiday color scheme, the user then selects a Diversity value and an Amount value to indicate respectively the number of colors they wish for the document and the number of components they wish to appear in color. It should be appreciated that there are a wide variety of manners in which the values for Diversity and Amount may be compared to the threshold of a component for the purpose of choosing a particular level to find an attribute value for that component. By way of example, one technique is to compare the Amount value to the threshold value for each component, and if the Amount value is greater than or equal to the threshold value, then the scheme level specified by the Diversity value is used for that component, otherwise scheme Level 1 is used for that component. Using a particular scheme level for a component means using the values found at that level for the attributes of the component.

In other words, the Amount value is compared to the threshold value for each component in turn. If the Amount value is less than the threshold value, then only Level 1 for that scheme is applied to the current component. Thus, if the threshold is very high for a component, then it is much more likely that the Level 1 color will always be used for the attributes for a particular component. This corresponds to a more conventional color scheme. Only by raising the Amount value extremely high will the user be able to equal or exceed the threshold value and thus change the level to be used. In this fashion, a high threshold value makes it more difficult for the user to change from a conventional color scheme to a more extreme color scheme.

On the other hand, if the user chooses the highest Amount value, then that Amount value will always be greater than or equal to any threshold for any component, and thus the scheme level specified by the Diversity value will be used to assign attribute values to that component. In this way, a high Amount value may be used to select from a higher level in a color scheme, thus ensuring that a more extreme color scheme would be used, and more components would appear in color. Such a use of Diversity values can be seen in FIG. 11. At Level 1, all three of the slots and their corresponding components would have a foreground color of black. However, assuming that the Amount value chosen by the user is higher than all component's threshold, then if the Diversity value is "5", then the Level 5 values will be used meaning that all components will either appear in red, orange or green.

FIG. 13 illustrates this technique with a simple example. Table 520 has user input Diversity values 522, user input Amount values 524, possible values for the foreground color attribute 526 for component Body Text, possible values 528 for Title, and possible values 530 for Product Title. Rows 541 to 546 of Table 520 correspond to different scenarios in which a user has chosen different Diversity and Amount values for its affect on the composition.

Starting with user specified values for Diversity and Amount in the first row 541, because the user specified Amount value of "1" is always less than any of the threshold values for the components as shown in FIG. 12, scheme Level 1 is used. Now by reference to FIG. 11, it can be seen that Level 1 requires that all components corresponding to the slots have a black foreground color. Thus, the first row of table 520 indicates that all of the components Body Text, Title and Product Title all have a foreground color of black.

In the second example of user settings (second row 542), the user has specified an Amount value "5" which is always greater than or equal to any of the color scheme thresholds for the components of FIG. 12. However, because now the scheme level specified by the Diversity value will be used, Level 1 will still be used because the Diversity value for second row is "1". Thus, the foreground color for each of the components is still black. This result is justified by recalling that even though the Amount value specifies that more components should be in color, the Diversity value specifies how many different colors should be used. Because the Diversity value only indicates that Level 1 should be used, Level 1 only provides one color, namely black. If a higher Diversity value had been specified, then more colors might have been used.

This use of more color can be seen in the third example (third row 543). In this example, an Amount value "5" is always equal to or greater than any of the color scheme thresholds in FIG. 12, thus, the Diversity value of "3" defines which level to use for each of the slots of FIG. 11. By reference to FIG. 12 and FIG. 11, it can be seen that the foreground color of Body Text will be black, that of Title will be red, and that of Product Title will also be red. In the fourth example (fourth row 544), the Diversity value is "4" instead of "3". By referring to Level 4 of FIG. 11, it can be seen that Body Text being a Normal slot component takes on the color maroon, the Title component being of slot Major Title takes on the color green, while the Product Title component being assigned to the slot Emphasis takes on the color red. This is an appropriate result since a high Amount value indicates that the user wishes more components to be in color, and a fairly high Diversity value of "4" indicates that there should be more colors available for use. As shown by the fourth row of FIG. 13, the components appear in three colors, namely maroon, green and red.

In the fifth example (fifth row 545), the Diversity value remains at "4" while the Amount value has dropped from "5" to "4". This change in the Amount value indicates that fewer components should then appear in color. Because an Amount value of "4" is not greater than or equal to a color scheme threshold value of "5" for the Body Text component, the scheme level to be used for this component is scheme Level 1. Because Body Text is assigned to the Normal slot, by reference to the Normal slot of FIG. 11 one can see that the corresponding value for the foreground color at Level 1 is black. Thus, in the fifth example where the Diversity value and the Amount value are both "4", the Body Text component appears in the black color instead of the maroon color. Thus, because the Amount value has decreased fewer components appear in color. Body Text appears in black, while only the components Title and Product Title appear in color.

In the sixth example (sixth row 546), an Amount value of "5" indicates that the scheme level of each of the components to be used will be the scheme level equal to the Diversity value of "5". Because Level 5 represents a more extreme Holiday color scheme, it is then appropriate that the components Body Text, Title and Product Title then appear respectively in the colors red, green and orange. Thus, high values for both result in not only more components being in color, but also more different colors being used. Thus, through the use of the sliders Diversity and Amount, a user can take advantage of the fine gradations of a color scheme found in the different levels.

Applying a Scheme to a Composition Example

A user may interact with and make use of the different levels within a scheme in wide variety of manners. By way of example, one possible technique has been described above with reference to FIGS. 11, 12 and 13 in which the sliders Diversity and Amount are used to select a level for the user. One embodiment for implementing such a technique will now be described with reference to FIGS. 14A and 14B.

FIG. 14A is a flowchart describing an embodiment of how a particular scheme (such as a Traditional font scheme, a Holiday color scheme, etc.) may be applied to a complete composition or to a subset of components within a composition. In a first step 602, a user chooses a scheme category to implement, such as a font scheme, a color scheme, a graphic scheme or any other type of scheme. Next, in step 604 the user selects a particular scheme from the chosen scheme category. For example, if the user had chosen a graphic scheme category, then the user may choose a particular graphic scheme such as a Business graphic scheme, a Festive graphic scheme, or a Medieval graphic scheme. Once a particular scheme has been chosen, the user then sets an Amount value for the chosen scheme in step 606, and sets a Diversity value for the chosen scheme in step 608. By setting these two values, the user is indicating how he or she would like that scheme to appear. It should be appreciated that steps 602 through 608 may be performed in any order. Also, the user may give input other than specifying Amount and Diversity values in order to select a level.

By way of example, a user may give input specifying directly a particular scheme level by name or number. Also, additional combinations of values such as Amount and Diversity may be input by a user in order to select a level. Or, a user may select a scheme or level using a graphic user interface. Concerning steps 602 to 608, should the user not specify an input, a default scheme or value could be used.

Next, in step 610 the user initiates application of the particular scheme to their composition by selecting a "GO" button or by some other initiation technique. Next, in step 612 the system determines the scheme level of the particular scheme to be used for each component of the composition, and assigns values for the attributes of those components based upon the chosen scheme level. In one embodiment, step 612 is performed by using the technique described above with reference to FIGS. 11, 12 and 13, and will be described in greater detail below with reference to FIG. 14B. Of course, other methods may be used to determine which scheme level to apply. Finally, in step 614 the total content of the composition is then refit to the media to which it is to be rendered if necessary. Such a refit may be needed, for example, if changes in font size have changed the sizes of various components or if changes in a graphic scheme or other necessitates a composition be resized to fit a particular medium. This fitting of content media may be performed using any suitable technique. By way of example, this fitting of content media may be performed by the techniques described in U.S. patent application Ser. Nos. 08/745,557, 08/709,649, 08/709,633 and 08/709,782 referenced above. After this step the procedure ends.

FIG. 14B illustrates one embodiment of step 612 of FIG. 14A. This embodiment is a loop that evaluates each component in turn; of course other techniques such as evaluating only one component, evaluating each attribute in turn, etc., are possible. In step 650, for the next component of the composition, its threshold value is determined for the chosen scheme category. This determining of a threshold value may be performed in many ways. By way of example, one way to determine a threshold value for a particular component may be done by way of the technique illustrated in FIG. 12. In this technique, a component is assigned a slot and a threshold. One who is skilled in the art will appreciate how a threshold value that is assigned to a particular component may be determined in this step by a simple lookup. Alternatively, an overall threshold may be assigned to a set of components or to a whole composition.

Next, in step 652 it is determined whether the Amount value is greater than or equal to the threshold value of the current component. If not, then in step 654 Level 1 for the chosen scheme category will be used to assign values to attributes for the current component. If so, then a level specified by the Diversity value will be used to assign values to attributes for the current component. In step 658 the values of the attributes stored at that scheme level are assigned to the current components. Values for attributes may be assigned to components in a wide variety of manners. By way of example, values for attributes may be assigned as disclosed by the techniques of FIGS. 11, 12 and 13. Once a component has had values assigned to its attributes, then step 660 determines if any more components are present in the composition. If so, then control returns to step 650. If not, than step 612 ends.

In an alternative embodiment, once a user has selected a scheme category and Amount and Diversity values, the system would not necessarily proceed to apply the chosen scheme to the complete composition, but the fit content to media step 614 may be called first. In the process of fitting content to media, each component may be queried about its size. In the course of this determination, steps 652 through 658 of FIG. 14B may be implemented in order to determine values for attributes of that component in order to determine a correct size for the current component. It should be appreciated that other techniques of making use of the levels within a particular scheme are possible. For example, values for an individual attribute may be determined for each component and then assigned to each component.

Computer System Embodiment

Embodiments of the present invention as described above employ various process steps involving data stored in computer systems. These steps are those requiring physical manipulation of physical quantities. Usually, though not necessarily, these quantities take the form of electrical or magnetic signals capable of being stored, transferred, combined, compared, and otherwise manipulated. It is sometimes convenient, principally for reasons of common usage, to refer to these signals as bits, values, elements, variables, characters, data structures, or the like. It should be remembered, however, that all of these and similar terms are to be associated with the appropriate physical quantities and are merely convenient labels applied to these quantities.

Further, the manipulations performed are often referred to in terms such as identifying, running, or comparing. In any of the operations described herein that form part of the present invention these operations are machine operations. Useful machines for performing the operations of embodiments of the present invention include general purpose digital computers or other similar devices. In all cases, there should be borne in mind the distinction between the method of operations in operating a computer and the method of computation itself. Embodiments of the present invention relate to method steps for operating a computer in processing electrical or other physical signals to generate other desired physical signals.

Embodiments of the present invention also relate to an apparatus for performing these operations. This apparatus may be specially constructed for the required purposes, or it may be a general purpose computer selectively activated or reconfigured by a computer program stored in the computer. The processes presented herein are not inherently related to any particular computer or other apparatus. In particular, various general purpose machines may be used with programs written in accordance with the teachings herein, or it may be more convenient to construct a more specialized apparatus to perform the required method steps. The required structure for a variety of these machines will appear from the description given above.

In addition, embodiments of the present invention further relate to computer readable media that include program instructions for performing various computer-implemented operations. The media and program instructions may be those specially designed and constructed for the purposes of the present invention, or they may be of the kind well known and available to those having skill in the computer software arts. Examples of computer-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Figure 15:
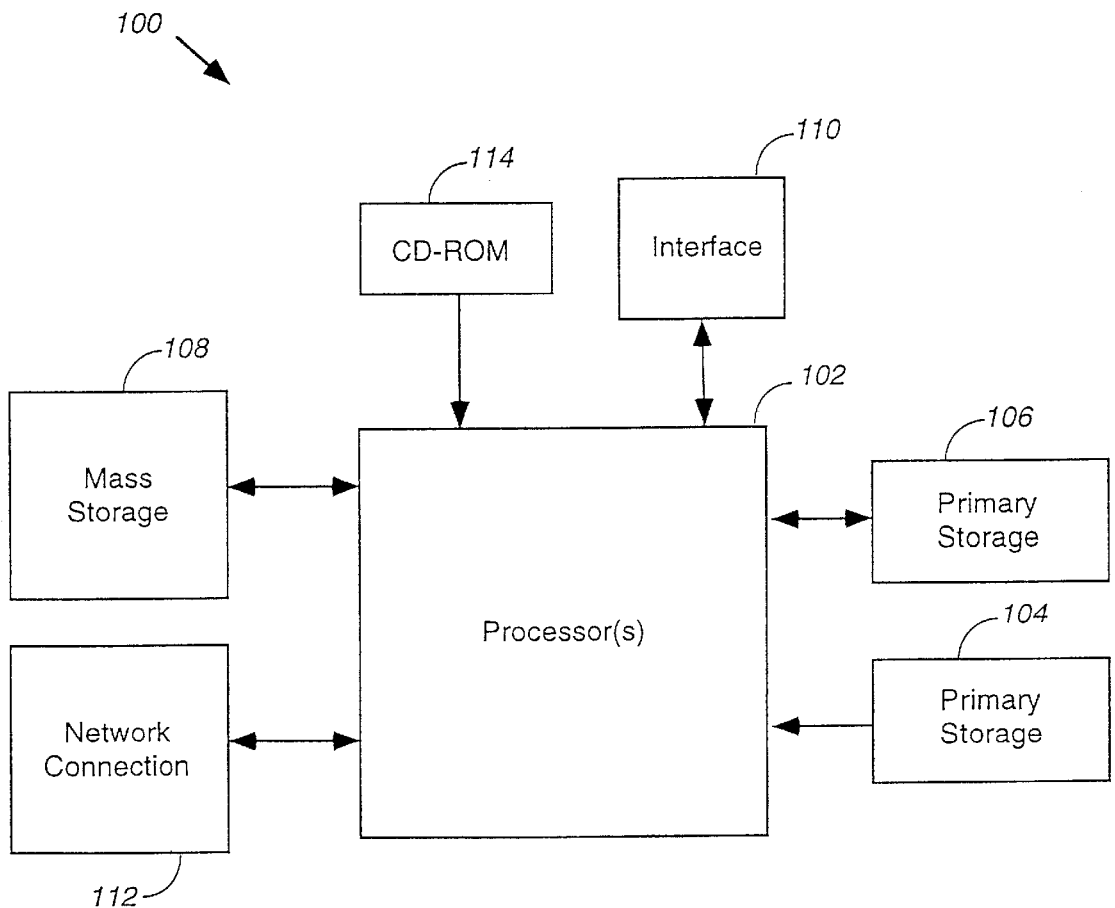
FIG. 15 shows a typical computer system suitable for implementing an embodiment of the present invention.

FIG. 15 illustrates a typical computer system in accordance with an embodiment of the present invention. The computer system 100 includes any number of processors 102 (also referred to as central processing units, or CPUs) that are coupled to storage devices including primary storage 106 (typically a random access memory, or RAM), primary storage 104 (typically a read only memory, or ROM). As is well known in the art, primary storage 104 acts to transfer data and instructions uni-directionally to the CPU and primary storage 106 is used typically to transfer data and instructions in a bi-directional manner. Both of these primary storage devices may include any suitable of the computer-readable media described above. A mass storage device 108 is also coupled bi-directionally to CPU 102 and provides additional data storage capacity and may include any of the computer-readable media described above. The mass storage device 108 may be used to store programs, data and the like and is typically a secondary storage medium such as a hard disk that is slower than primary storage. It will be appreciated that the information retained within the mass storage device 108, may, in appropriate cases, be incorporated in standard fashion as part of primary storage 106 as virtual memory. A specific mass storage device such as a CD-ROM 114 may also pass data uni-directionally to the CPU.

CPU 102 is also coupled to an interface 110 that includes one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 102 optionally may be coupled to a computer or telecommunications network using a network connection as shown generally at 112. With such a network connection, it is contemplated that the CPU might receive information from the network, or might output information to the network in the course of performing the above-described method steps. The above-described devices and materials will be familiar to those of skill in the computer hardware and software arts.

Although the foregoing invention has been described in some detail for purposes of clarity of understanding, it will be apparent that certain changes and modifications may be practiced within the scope of the appended claims. For instance, the present invention is applicable to a variety of types of information presented in a document, web page, computer screen, etc. Also, the association of a particular component with a scheme slot and a threshold value may be performed in a variety of ways. Additionally, even though levels are shown as implemented in one embodiment, they may be implemented in many ways. Levels may represent gradual changes within a scheme, rather abrupt changes, or may not necessarily follow a particular pattern. That is, levels and their associated attributes within a particular scheme may be random in a certain sense. Also, even though levels have been shown as part of a particular scheme, they could be a scheme in their own right. Also, a wide variety of types of user input may be received in order to choose a scheme and a level, in addition to or in lieu of the disclosed Amount and Diversity values. Furthermore, the values of attributes may be applied to components in a composition in many different ways. A single attribute could be applied to all components, or many attributes could be applied to a single component, etc. Therefore, the described embodiments should be taken as illustrative and not restrictive, and the invention should not be limited to the details given herein but should be defined by the following claims and their full scope of equivalents.

We claim:

1. A scheme instance data structure embodied in a computer-readable medium for applying a coordinated plurality of attributes to a plurality of components within a composition, the scheme instance data structure associated with a scheme category indicative of a type of said scheme instance data structure, said scheme instance data structure comprising:

a plurality of attributes corresponding to said scheme category; and a plurality of scheme slots, wherein each said scheme slot is associated with one or more components of the composition, wherein each said scheme slot is associated with each of said plurality of attributes such that each said scheme slot is arranged to hold a value corresponding to each of said plurality of attributes, such that for each of said scheme slots, said scheme instance data structure is capable of being utilized to apply values of said associated attributes to said one or more components of the composition.

2. A scheme instance data structure as recited in claim 1 further comprising a plurality of values for said plurality of attributes, such that each of said scheme slots holds a value corresponding to each of said plurality of attributes.

3. A scheme instance data structure as recited in claim 1 further comprising a plurality of levels, each of said levels including:

a plurality of level values, wherein each of said scheme slots is arranged to hold one of said level values corresponding to each of said plurality of attributes.

4. A scheme instance data structures as recited in claim 1 wherein said scheme instance category comprises a member of the group consisting of: a font scheme, a color scheme, a graphics scheme and a paragraph scheme.

5. A software product comprising a plurality of product components, each said product component including a plurality of associated scheme slots, and each said associated scheme slot is associated with a distinct scheme instance, said distinct scheme instance being part of a scheme instance data structure for applying a plurality of attributes to a plurality of components within a composition, the scheme instance data structure associated with a scheme category indicative of a type of said scheme instance data structure, said scheme instance data structure including:

a plurality of attributes corresponding to said scheme category; and a plurality of scheme slots, wherein each said scheme slot is associated with one or more components of the composition, wherein each said scheme slot is associated with each of said plurality of attributes such that each said scheme slot is arranged to hold a value corresponding to each of said plurality of attributes, such that for each of said scheme slots, said scheme instance data structure is capable of being utilized to apply values of said associated attributes to said one or more components of the composition.

6. A software product comprising a plurality of product components, each said product component including:

a first associated scheme slot selected from a plurality of scheme slots; and a plurality of additional scheme slots selected from the plurality of scheme slots, wherein each said scheme slot is associated with one or more components of a composition, wherein each said scheme slot is associated with each of a plurality of attributes corresponding to a scheme category indicative of a type of a scheme instance data structure such that each said scheme slot is arranged to hold a distinct value corresponding to each of said plurality of attributes, such that for each of said schemes slots, said scheme instance data structure is capable of being utilized to apply values of said associated attributes to said one or more components of the composition.

7. A software product comprising a plurality of product components, each said product component having a plurality of associated scheme slots, each said associated scheme slot is associated with a scheme instance data structure for applying a coordinated plurality of attributes to a plurality of components within a composition, said scheme instance data structure including:

a plurality of coordinated attributes corresponding to a scheme category;

a plurality of scheme slots, and a plurality of levels, each said level is arranged to hold a plurality of level values, wherein each said scheme slot is associated with one or more components of the composition, wherein each said scheme slot is associated with each of said plurality of attributes, wherein each said scheme slot is arranged to hold one of said level values for each of said plurality of attributes, such that for each of said scheme slots, said scheme instance data structure is capable of being utilized to apply level values of said associated attributes to said one or more components of the composition.

8. The software product of claim 7, further including:

a first associated scheme slot selected from the plurality of scheme slots; and a plurality of additional scheme slots selected from plurality of scheme slots.

9. A method of applying a color scheme to elements on a computer display, said method comprising the steps of:

receiving a composition having a set of elements arranged on a computer display having a first color scheme; said elements being arranged into groups and said first color scheme providing predefined color characteristics for each group of elements, each of said groups of elements having a predefined color relationship with other of said groups of elements under said first color scheme;

choosing a second color scheme to be applied to said composition of elements that is different from said first color scheme, said second color scheme providing predefined color characteristics for each group of elements, each of said groups of elements under said second color scheme is a color scheme slot, each of said groups of elements having a predefined color relationship with other of said groups of elements under said second color scheme;

associating each group of elements with the predefined color characteristics provided by said second color scheme, the predefined color characteristics is associated with each group including color attributes;

applying said second color scheme to said elements such that each of said elements takes on the predefined color characteristics of the group with which each element is associated; and displaying said elements of said composition in said second color scheme on said computer display.

10. A method of applying a color scheme to elements on a computer display, said method comprising the steps of:

receiving a composition having a set of elements arranged on a computer display having a first color scheme, said elements being arranged into groups and said first color scheme providing predefined color characteristics for each group of elements, each of said groups of elements having a predefined color relationship with other of said groups of elements under said first color scheme;

choosing a second color scheme to be applied to said composition of elements that is different from said first color scheme, said second color scheme providing predefined color characteristics for each group of elements, each of said groups of elements having a predefined color relationship with other of said groups of elements under said second color scheme;

associating each group of elements with the predefined color characteristics provided by said second color scheme;

applying said second color scheme to said elements such that each of said elements takes on the predefined color characteristics of the group with which each element is associated;

displaying said elements of said composition in said second color scheme on said computer display; and pre-assigning each of said elements to one of said groups of said second color scheme, whereby said elements are arranged into said groups.

11. A method as recited in claim 10 further comprising the steps of:

choosing a third color scheme to be applied to said composition of elements, said third color scheme being different from said second color scheme, such that said step of pre-assigning operates also to pre-assign said elements to groups of said third color scheme, said groups of said third color scheme each having predefined color characteristics; and applying said third color scheme to said elements such that each of said elements such that each of said elements takes on the predefined color characteristics of the group with which each element is associated.

* * * * *